US012077731B2

(12) United States Patent
Piombino et al.

(10) Patent No.: US 12,077,731 B2
(45) Date of Patent: Sep. 3, 2024

(54) USE OF POLYMER BLENDS TO REDUCE OR ELIMINATE AMINE OXIDE IN HAND DISHWASHING DETERGENTS

(71) Applicant: Henkel AG & Co. KGaA, Duesseldorf (DE)

(72) Inventors: Michelle A. Piombino, West Haven, CT (US); Daniel Thomas Piorkowski, Fairfield, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 104 days.

(21) Appl. No.: 17/445,041

(22) Filed: Aug. 13, 2021

(65) Prior Publication Data

US 2023/0062984 A1 Mar. 2, 2023

(51) Int. Cl.

| | |
|---|---|
| ***C11D 1/83*** | (2006.01) |
| ***C11D 1/14*** | (2006.01) |
| ***C11D 3/00*** | (2006.01) |
| ***C11D 3/30*** | (2006.01) |
| ***C11D 3/37*** | (2006.01) |

(52) U.S. Cl.

CPC ............ *C11D 3/3723* (2013.01); *C11D 1/143* (2013.01); *C11D 1/146* (2013.01); *C11D 3/0094* (2013.01); *C11D 3/3792* (2013.01)

(58) Field of Classification Search

CPC ......... C11D 1/143; C11D 1/146; C11D 1/665; C11D 1/83; C11D 3/2041; C11D 3/30; C11D 3/3707; C11D 3/3723; C11D 3/3792

See application file for complete search history.

(56) References Cited

U.S. PATENT DOCUMENTS

| | | | | |
|---|---|---|---|---|
| 5,719,118 A | | 2/1998 | Crutcher et al. | |
| 5,858,948 A | * | 1/1999 | Ghosh ...................... | C11D 1/86 510/528 |
| 5,955,411 A | | 9/1999 | Gorlin | |

(Continued)

FOREIGN PATENT DOCUMENTS

| | | |
|---|---|---|
| EP | 1365011 A1 | 11/2003 |
| EP | 3440174 A1 | 2/2019 |

(Continued)

OTHER PUBLICATIONS

Dewolf Chemical an Azelis company, Sokalan® HP 20, https://dewolfchem.com/shop/sokalan-hp-20/, Jul. 9, 2021, Azelis Americas, LLC, United States.

(Continued)

*Primary Examiner* — Brian P Mruk

(74) *Attorney, Agent, or Firm* — Bojuan Deng

(57) ABSTRACT

A method of improving or stabilizing foaming of a hand dishwashing detergent composition when combined with water is achieved by providing one or more of polyethyleneimine ethoxylate and polyethylene glycol to a hand dishwashing detergent composition comprising an amine oxide. Hand dishwashing detergent compositions to reduce amine oxide content contain water, surfactant base, and foaming booster consisting of amine oxide, and one or more of polyethyleneimine ethoxylate and polyethylene glycol. A foaming booster consisting of polyethyleneimine ethoxylate and polyethylene glycol can eliminate use of amine oxides.

5 Claims, 2 Drawing Sheets

(56) References Cited

U.S. PATENT DOCUMENTS

| | | | | |
|---|---|---|---|---|
| 6,221,822 | B1 | 4/2001 | Crutcher et al. | |
| 10,774,294 | B2 * | 9/2020 | Piorkowski | C11D 3/43 |
| 2016/0177224 | A1 * | 6/2016 | Braeckman | C11D 1/14<br>510/237 |
| 2019/0010427 | A1 * | 1/2019 | Frankenbach | C11D 3/3742 |
| 2021/0155875 | A1 * | 5/2021 | Sun | C11D 3/222 |
| 2022/0186144 | A1 * | 6/2022 | Coletta | C11D 3/2065 |

FOREIGN PATENT DOCUMENTS

| | | | | |
|---|---|---|---|---|
| EP | 3670639 | A1 | 6/2020 | |
| WO | 2008146194 | A1 | 12/2008 | |
| WO | 2014209576 | A1 | 12/2014 | |
| WO | 2015164515 | A1 | 10/2015 | |
| WO | 2017011230 | A1 | 1/2017 | |
| WO | WO 2017/173592 | * | 10/2017 | C11D 1/94 |

OTHER PUBLICATIONS

European Patent Office, European Search Report, EP22189825, Dec. 19, 2022, pp. 1-9, Munich, Germany.

* cited by examiner

USE OF POLYMER BLENDS TO REDUCE OR ELIMINATE AMINE OXIDE IN HAND DISHWASHING DETERGENTS

FIELD OF THE INVENTION

The present invention relates to hand dishwashing detergent compositions. More specifically, the present invention relates to use of polymer blends to reduce or replace amine oxide in hand dishwashing detergent compositions while maintaining foaming and cleaning performance.

BACKGROUND OF THE INVENTION

Consumers often associate the creation and long-lastingness of foam with efficacy of a hand dishwashing detergent and prefer high foaming detergents. To achieve such foam, hand dishwashing detergents typically contain two major fundamental components, a surfactant base and a foam booster. The surfactant base is largely responsible for the foam profile. Foam boosters are utilized to prolong the presence of foam during the dishwashing process.

Typically, hand dishwashing detergents with longer lasting foam enable consumers to wash more dishes (i.e., "plate count") prior to needing to add more detergent. The higher the plate count, the more premium the detergent is perceived.

It is known in the art that hand dishwashing detergent compositions including amine oxides have desirable foaming properties. For instance, U.S. 2016/0177224 is claimed to provide a hand dishwashing detergent with improved foaming properties comprising an anionic surfactant and about 12.5% to about 40% by weight amine oxide surfactant.

U.S. Pat. Nos. 6,221,822 and 5,719,118 disclose foaming compositions consisting of a surfactant base and a foam booster/stabilizer which includes amine oxide. The foam stabilizer is disclosed as comprising two constituents, wherein the first constituent is a polyalkoxylated (propyl) amine, and the second constituent is selected from the group consisting of amine oxides, betaines, alkanolamides and sultaines.

Amine oxide is the predominant foam booster on the market today, and is widely used in commercial liquid hand dishwashing detergents. However, amine oxides also have known solubility issues and there have been instances of manufacturing issues and disruption of supply. Thus, it is desirable to have alternatives for amine oxides and/or ways to reduce the use of amine oxides in hand dishwashing detergent compositions yet maintain desirable foaming properties.

Therefore, it is an object of the present invention to provide methods of reducing or eliminating amine in a foaming hand dishwashing detergent.

It is an object of the invention to provide hand dishwashing detergent compositions which produce a significant amount of foam and achieve a high plate count while reducing or eliminating the amount of amine oxide in the composition.

SUMMARY OF THE INVENTION

The foregoing objectives are achieved by provision of a method for reducing or eliminating the use of amine oxide (AO) in a hand dishwashing composition by provision of hand dishwashing detergent compositions that have low amounts of, or are substantially free of, AO.

It was observed that the amount of amine oxide in hand dishwashing detergent formulations can be reduced by up to 90% and backfilled with blends of polyethyleneimine ethoxylates (PEI-EO) and high molecular weight polyethylene glycol (PEG) to maintain foam performance. In some instances, AO can be eliminated completely and replaced with a blend of PEI-EO and PEG.

Unexpectedly, it was observed that blends of AO, PEG and PEI-EO generated more foam when used together, rather than just by themselves in a formulation (i.e., compared with a control using only AO with no PEG or PEI-EO).

In one aspect, the invention provides a hand dishwashing detergent composition comprising water; surfactant base; and foaming booster consisting of amine oxide, and one or more of polyethyleneimine ethoxylate and polyethylene glycol.

In some embodiments, water comprises less than 50% by weight of the detergent composition.

In certain embodiments, the polyethyleneimine ethoxylate consists essentially of or consists of polyethylene imine. In some embodiments, the polyethylene imine has a molecular weight of 600 modified by ethoxylation to a degree of about 20 ethyleneoxy residues per nitrogen (PEI 600 $EO_{20}$).

In some embodiments, the amine oxide comprises amido amine oxide. In some of those embodiments, the amine oxide comprises, consists essentially of, or consists of lauryl/myristyl amidopropyl amine oxide.

Preferably, the polyethylene glycol is high molecular weight. In certain embodiments, the polyethylene glycol has a number-average molecular weight of about 200,000 Daltons.

In some embodiments, the surfactant base comprises about 10% to about 50% by weight of the detergent composition.

In certain embodiments, the surfactant base comprises LAS. In certain of those embodiments, the LAS comprises about 10% to about 30% by weight of the detergent composition.

In some embodiments, the surfactant base comprises LAS and SLS. In certain of those embodiments, the surfactant base consists essentially of or consist of LAS and SLS.

In certain embodiments, the detergent composition is substantially free of AES. In certain of those embodiments, the detergent composition is substantially free of SLES.

Preferably, the composition has an initial foam height using a Ross-Miles test of greater than 15 cm, more preferably greater than 16 cm most preferably greater than 16.5 cm.

In some embodiments, the composition comprises less than 5% amine oxide.

In another aspect, the invention provides a hand dishwashing detergent composition comprising water; surfactant base; and foaming booster consisting of polyethyleneimine ethoxylate and polyethylene glycol.

In some embodiments, the polyethyleneimine ethoxylate is about 5% to about 85% by weight of the foaming booster and/or the polyethylene glycol is about 15% to about 95% by weight of the foaming booster.

In certain embodiments, water comprises less than 50% by weight of the detergent composition.

In some embodiments, the polyethyleneimine ethoxylate consists essentially of or consists of polyethylene imine. In some embodiments, the polyethylene imine has a molecular weight of 600 modified by ethoxylation to a degree of about 20 ethyleneoxy residues per nitrogen (PEI 600 $EO_{20}$).

Preferably, the polyethylene glycol is high molecular weight. In certain embodiments, the polyethylene glycol has a number-average molecular weight of about 200,000 Daltons.

In some embodiments, the surfactant base comprises about 10% to about 50% by weight of the detergent composition.

In certain embodiments, the surfactant base comprises LAS. In certain of those embodiments, the LAS comprises about 10% to about 30% by weight of the detergent composition.

In some embodiments, the surfactant base comprises LAS and SLS. IN certain of those embodiments, the surfactant base consists essentially of or consist of LAS and SLS.

In certain embodiments, the detergent composition is substantially free of AES. In certain of those embodiments, the detergent composition is substantially free of SLES.

Preferably, the composition has an initial foam height using a Ross-Miles test of greater than 15 cm, more preferably greater than 16 cm most preferably greater than 16.5 cm.

In some embodiments, the composition comprises less than 5% amine oxide.

In yet another aspect, the invention provides a method of improving foaming of a hand dishwashing detergent composition when combined with water, comprising: providing one or more of polyethyleneimine ethoxylate and polyethylene glycol to a hand dishwashing detergent composition comprising an amine oxide.

In certain preferred embodiments, the method results in an initial foam height of the composition greater than 16.5 cm, the foam height determined using a Ross-Miles test.

In a further aspect, the invention provides a method of stabilizing foam formed by a hand dishwashing detergent composition when combined with water, comprising: providing one or more of polyethyleneimine ethoxylate and polyethylene glycol to a hand dishwashing detergent composition comprising an amine oxide.

In certain preferred embodiments, the method results in a 5-minute foam height of the composition that is greater than 14 cm, the foam height determined using a Ross-Miles test.

According to another aspect of the invention, there is provided a process for making the dishwashing detergent of the invention. The process requires preparing the surfactant base by mixing LAS and caustic soda for about 5-10 minutes prior to addition of any sodium xylene sulfate.

According to the yet another aspect of the invention, there is provided a method of manual dishwashing comprising the step of: delivering a detergent composition of the invention to a volume of water and immersing soiled dishware in the water. When the composition of the invention is used according to this method an excellent suds profile, with a long-lasting effect is achieved.

DETAILED DESCRIPTION OF THE INVENTION

Figure 1:
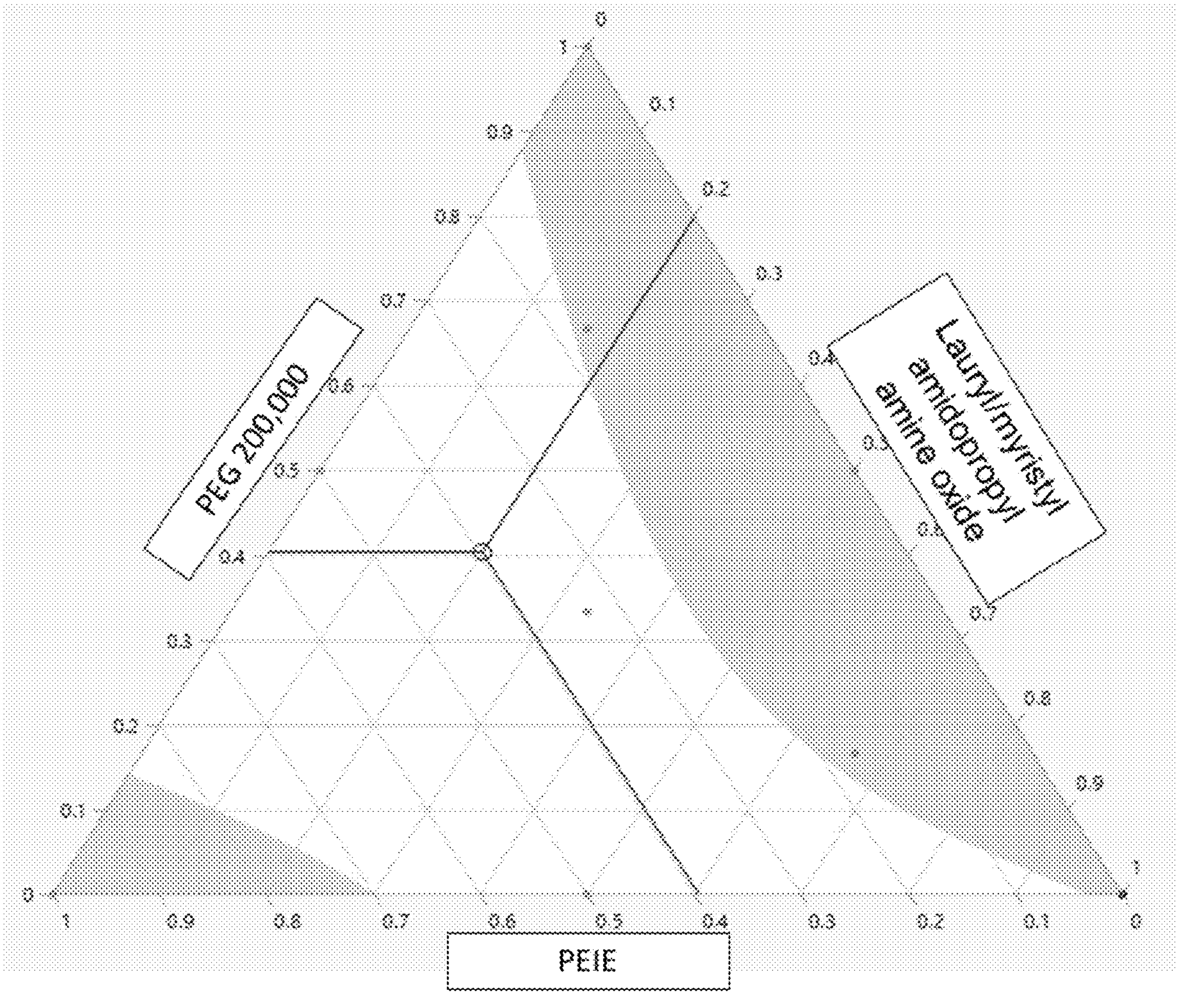
FIG. 1 is a ternary plot showing ratios of polyethylene glycol (PEG), an 30% amine oxide (AO) ingredient, and 80% polyethyleneimine, alkoxylated (PEIE) ingredient in a hand dishwashing detergent at the initial stage of a Ross-Miles foam test. The white area indicates a foam height of 16.6 cm or greater.

The following detailed description is merely exemplary in nature and is not intended to limit the compositions or methods described herein. Furthermore, there is no intention to be bound by any theory presented in the preceding background or the following detailed description.

The articles "a," "an," and "the" can be used herein to refer to one or to more than one (i.e., to at least one) of the grammatical object of the article, unless the language and/or context clearly indicates otherwise. By way of example, "an element" means one element or more than one element.

As used herein, the terms "comprises," "comprising," "having," "including," "containing," and the like can be open-ended terms meaning "including, but not limited to."

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated.

As used herein, "percent" and "%" refer to weight percentage unless otherwise specified. As used herein, the phrase "substantially free" or "substantially X-free," wherein X is a specified ingredient, means that a given formulation is at least about 97 percent by weight free of the specified ingredient, and in certain embodiments as specified herein, at least about 98, at least about 99, at least about 99.9, or at least about 99.99 percent by weight free of the specified ingredient.

For the purpose of this invention, the term "dishware" includes cookware and tableware.

The present disclosure provides a method of decreasing or eliminating AO in a foaming hand dishwashing detergent comprising a dishwashing cleaning effective amount of a surfactant base and foam booster or foam stabilizer. The invention also provides hand dishwashing detergents which have a low amount of, or are substantially free of, amine oxide. The methods and compositions are able to provide improved or sustained foaming of hand dishwashing detergents even though the amount of AO is reduced.

The Detergent Composition

The detergent composition is a hand dishwashing detergent in liquid form. Generally, liquid dish detergent compositions include a surfactant base system (surfactant base) and foam stabilizers or boosters, and diluents. Optionally, rheology modifiers, hydrotropes and other additives or adjuvants known to one of ordinary skill in the art that affect, for instance, the viscosity, aesthetics, shelf-life, etc. of the composition can also be included.

In some embodiments, the diluent comprises water. In certain embodiments, the composition will include greater than 50% by weight water. In preferred embodiments, the detergent compositions contain about 50% by weight or less of water.

Preferably the pH of the composition is adjusted to between 3 and 14, preferably between 4 and 13, more preferably between 5 and 8.5, and most preferably around 7. The pH is measured as a 10 wt % product solution in deionized water at 20° C. The pH of the composition can be adjusted using pH modifying ingredients known in the art.

Surfactant Base

The surfactant base of hand dishwashing detergent compositions primarily contributes to cleaning and foaming. The surfactant base may comprise about 10% to about 50% of the detergent composition. Preferably, the surfactant base is about 20% to about 40% of the detergent composition. In highly preferred embodiments, the surfactant base is about 25% to about 35% of the detergent composition.

The surfactant base of the detergent compositions can include a single primary surfactant or a mixture of both primary and secondary surfactants. Typically, the primary surfactants are high foaming anionic surfactants. Any number of surfactants can be used in the detergent compositions of the present invention. The most common anionic surfactants include: an organic sulfate or sulfonate surfactant, preferably selected from alkyl benzene sulfonates (LAS), alkyl sulfates and their ethoxy analogues (AES), $C_{13}$-$C_{18}$ paraffin sulfonates $C_{10}$-$C_{16}$ olefin sulfonates, $C_{10}$-$C_{20}$ alkyl glyceryl ether sulfonates, $C_9$-$C_{17}$ acyl-N—($C_1$-$C_4$ alkyl) or —N—($C_2$-$C_4$ hydroxyalkyl) glucamine sulfates, and mixtures of any of the foregoing.

More preferably the anionic surfactant is selected from $C_{10}$-$C_{16}$ linear alkyl benzene sulfonates (LAS), $C_{10}$-$C_{18}$ alkyl sulfates, alkyl ethoxy sulfates (AES), alkyl glyceryl ether sulfonates and paraffin sulfonates.

Linear alkylbenzene sulfonates (LAS) refers to water soluble salts of a linear alkyl benzene sulfonate having between 8 and 22 carbon atoms of the linear alkyl group. The salt can be an alkali metal salt, or an ammonium, alkylammonium, or alkanolammonium salt. In one embodiment, the LAS comprises an alkali metal salt of $C_{10}$-$C_{16}$ alkyl benzene sulfonic acids, such as $C_{11}$-$C_{14}$ alkyl benzene sulfonic acids. Suitable LAS include sodium and potassium linear alkylbenzene sulfonates in which the average number of carbon atoms in the alkyl group is between 11 and 14. Sodium $C_{11}$-$C_{14}$ (e.g., $C_{12}$) LAS is one suitable anionic surfactant for use herein. Exemplary LAS used herein include LAS sulfonic acid.

Typically, the detergent compositions herein will include about 5% to about 25% by weight of LAS. In certain of those embodiments, the detergent composition will include about 5% to about 10% by weight of LAS. In certain other embodiments, the detergent composition will include about 15% to about 25% by weight of LAS.

In some embodiments, the detergent composition is substantially free of LAS.

Alkyl ethoxy sulfates or alcohol ethoxysulfate (AES) as contemplated herein refers to compounds having Formula (I):

$$R_1—O—(C_2H_4O)_n—SO_3M \quad (I),$$

wherein $R_1$ is a $C_8$-$C_{22}$ alkyl group, n is from 1 to 20, and M is a salt-forming cation. Preferably, $R_1$ is a $C_{10}$-$C_{18}$ alkyl, or a $C_{10}$-$C_{15}$ alkyl, n is from 1 to 15, 1 to 10, or 1 to 8, and M is sodium, potassium, ammonium, alkylammonium, or alkanolammonium. More preferably, $R_1$ is a $C_{12}$-$C_{16}$ alkyl, n is from 1 to 6, and M is sodium. The AES will generally be used in the form of mixtures comprising varying $R_1$ chain lengths and varying degrees of ethoxylation. Frequently such mixtures will inevitably also contain some unethoxylated alkyl sulfate materials, i.e., n=0 in the above Formula (I). Unethoxylated alkyl sulfates may also be added separately to the surfactant base of present disclosure and used as or in any anionic surfactant component which may be present. Exemplary alkyl ethoxy sulfates include ammonium $C_{12}$-$C_{15}$ pareth sulfate, sodium laureth sulfate (SLES) and ammonium laureth sulfate. In one embodiment, the alkyl ether sulfate is sodium lauryl ether sulphate (SLES).

In certain embodiments, the compositions herein will include about 5% to about 10% by weight of an AES, preferably SLES.

Suitable unalkoyxylated, e.g., unethoxylated, alkyl ether sulfate surfactants are those made by the sulfation of higher $C_8$-$C_{20}$ fatty alcohols, more preferably an average of 12-14 carbon atoms preferably in a linear chain. $C_{10}$-$C_{16}$ alcohols, derived from natural fats, or Ziegler olefin build-up, or OXO synthesis, form suitable sources for the alkyl group. Conventional alkyl sulfate surfactants may also be suitable herein, which have the general formula of: $R_1OSO_3M^+$, wherein $R_1$ and M each has the same definition as described above.

Examples of naturally occurring materials from which the alcohols can be derived are coconut oil and palm kernel oil and the corresponding fatty acids.

Exemplary alkyl sulfates include Ammonium $C_{12}$-$C_{15}$ alkyl sulfate, sodium lauryl sulfate (SLS), and ammonium lauryl sulfate.

Preferably, when included, the compositions contain about 25% to about 35% by weight of a lauryl sulfate ingredient, most preferably one that contains SLS. In certain preferred embodiments, the detergent composition will contain about 8% to about 12% by weight of active lauryl sulfate, most preferably about 10% active SLS.

In certain embodiments, the detergent composition is substantially free of an AES. In other embodiments, the detergent composition is substantially free of an alkyl sulfate surfactant, such as SLS.

Preferably, the detergent composition is substantially free of an AES, such as sodium or ammonium LES.

Paraffin sulfonates useful in the present invention have from 13 to 18 carbon atoms per molecule, more desirably 13 to 16 carbon atoms per molecule. These sulfonates are preferably prepared by subjecting a cut of paraffin, corresponding to the chain lengths specific above, to the action of sulfur dioxide and oxygen in accordance with the well-known sulfoxidation process. The product of this reaction is a secondary sulfonic acid which is then neutralized with a suitable base to provide a water-soluble secondary alkyl sulfonate. Similar secondary alkyl sulfonates may be obtained by other methods, e.g., by the sulfochlorination method in which chlorine and sulfur dioxide are reacted with paraffins in the presence of actinic light, the resulting sulfonyl chlorides being hydrolyzed and neutralized to form the secondary alkyl sulfonates. Whatever technique is employed, it is normally desirable to produce the sulfonate as the monosulfonate, having no unreacted starting hydrocarbon or having only a limited proportion thereof present and with little or no inorganic salt by-product. Similarly, the proportions of disulfonate or higher sulfonated materials will be minimized, although some may be present. The monosulfonate may be terminally sulfonated or the sulfonate group may be joined on the 2-carbon or other carbon of the linear chain. Similarly, any accompanying disulfonate, usually produced when an excess of sulfonating agent is present, may have the sulfonate groups distributed over different carbon atoms of the paraffin base, and mixtures of the monosulfonates and disulfonates may be present.

Mixtures of monoalkane sulfonates wherein the alkanes are of 14 and 15 carbon atoms are particularly preferred wherein the sulfonates are present in the weight ratio of $C_{14}$-$C_{15}$ paraffins in the range from 1:3 to 3:1.

Olefin sulfonates useful in the present invention are mixtures of alkene-1-sulfonates, alkene hydroxysulfonates, alkene disulfonates and hydroxydisulfonates, and are described in U.S. Pat. No. 3,332,800, issued to P. F. Pflauner and A. Kessler on Jul. 25, 1967.

Suitable alkyl glyceryl ether sulfonates are those derived from ethers of coconut oil and tallow.

Other sulfate surfactants include the $C_9$-$C_{17}$ acyl-N—($C_1$-$C_4$ alkyl) or —N—($C_1$-$C_2$ hydroxyalkyl) glucamine sulfates, preferably those in which the $C_9$-$C_{17}$ acyl group is derived from coconut or palm kernel oil. These materials can be prepared by the method disclosed in U.S. Pat. No. 2,717,894, issued Sep. 13, 1955 to Schwartz. The counterion for the anionic surfactant component is preferably selected from sodium, potassium, magnesium, ammonium or alkanol-ammonium, and mixtures thereof.

The secondary surfactants of the base surfactant system of the detergent composition are selected from: (a) anionic surfactants, including those discussed previously; and (b) nonionic surfactants. Suitable nonionic surfactants include:

1) The polyethylene, polypropylene, and polybutylene oxide condensates of alkyl phenols. In general, the polyethylene oxide condensates are preferred. These compounds include the condensation products of alkyl phenols having a methyl group containing from about 6 to about 12 carbon atoms in either a straight chain or branched chain configuration with the alkylene oxide. In a preferred embodiment, the ethylene oxide is present in an amount equal to from about 2 to about 25 moles of ethylene oxide per mole of alkyl phenol.

2) The alkyl ethoxylate condensation products of aliphatic alcohols with from about 1 to about 25 moles of ethylene oxide. The alkyl chain of the aliphatic alcohol can either be straight or branched, primary or secondary, and generally contains from 8 to 22 carbon atoms. Particularly preferred are the condensation products of alcohols having a methyl group containing from 10 to 20 carbon atoms with from about 2 to about 10 moles of ethylene oxide per mole of alcohol. Most preferred are the condensation products of alcohols having a methyl group containing from 10 to 14 carbon atoms with from about 6 to about 10 moles of ethylene oxide per mole of alcohol.

3) The condensation products of ethylene oxide with a hydrophobic base formed by the condensation of propylene oxide with propylene glycol. The hydrophobic portion of these compounds preferably has a molecular weight of from about 1500 to about 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide.

4) The condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000.

5) Alkylpolysaccharides disclosed in U.S. Pat. No. 4,565,647, Llenado, issued Jan. 21, 1986, having a hydrophobic group containing from about 6 to about 30 carbon atoms, preferably from about 10 to about 16 carbon atoms and a polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose and galactosyl moieties can be substituted for the glucosyl moieties. (Optionally, the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

The preferred alkylpolyglycosides have the formula:

$$R^2O(C_nH_{2n}O)_t(\text{glycosyl})_x$$

wherein $R^2$ is selected from the group consisting of alkyl, alkylphenyl, hydroxylakyl, hydroxyalkylphenyl, and mixtures thereof in which the alkyl groups contain from 10 to 18, preferably from 12 to 14, carbon atoms; n is 2 or 3, preferably 2; t is from 0 to about 10, preferably 0; and x is from about 1:3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

Other suitable surfactants are zwitterionic. These surfactants include betaines, such as alkyl betaines, alkylamidobetaine, amidazoliniumbetaine, sulfobetaine (INCI Sultaines) as well as Phosphobetaine.

Examples of suitable betaines and sulfobetaine are the following [designated in accordance with INCI]: Almondamidopropyl of betaines, Apricotam idopropyl betaines, Avocadamidopropyl of betaines, Babassuamidopropyl of betaines, Behenam idopropyl betaines, Behenyl of betaines, betaines, Canolam idopropyl betaines, Capryl/Capram idopropyl betaines, Carnitine, Cetyl of betaines, Cocamidoethyl of betaines, Cocam idopropyl betaines, Cocam idopropyl Hydroxysultaine, Coco betaines, Coco Hydroxysultaine, Coco/Oleam idopropyl betaines, Coco Sultaine, Decyl of betaines, Dihydroxyethyl Oleyl Glycinate, Dihydroxyethyl Soy Glycinate, Dihydroxyethyl Stearyl Glycinate, Dihydroxyethyl Tallow Glycinate, Dimethicone Propyl of PG-betaines, Erucam idopropyl Hydroxysultaine, Hydrogenated Tallow of betaines, Isostearam idopropyl betaines, Lauram idopropyl betaines, Lauryl of betaines, Lauryl Hydroxysultaine, Lauryl Sultaine, Milkam idopropyl betaines, Minkamidopropyl of betaines, Myristam idopropyl betaines, Myristyl of betaines, Oleam idopropyl betaines, Oleam idopropyl Hydroxysultaine, Oleyl of betaines, Olivamidopropyl of betaines, Palmam idopropyl betaines, Palm itam idopropyl betaines, Palmitoyl Carnitine, Palm Kernelam idopropyl betaines, Polytetrafluoroethylene Acetoxypropyl of betaines, Ricinoleam idopropyl betaines, Sesam idopropyl betaines, Soyam idopropyl betaines, Stearam idopropyl betaines, Stearyl of betaines, Tallowam idopropyl betaines, Tallowam idopropyl Hydroxysultaine, Tallow of betaines, Tallow Dihydroxyethyl of betaines, Undecylenam idopropyl betaines and Wheat Germam idopropyl betaines.

A preferred betaine is, for example, Cocoamidopropylbetaine (CAPB).

Additionally, numerous other surfactants are known and suitable for use in the composition of the present invention.

The components of the surfactant base are selected on the following basis: price, performance, component compatibility, soil, and detergent conditions, and/or the type of formula under development. The surfactant base may vary depending on the desired performance characteristic such as mildness, grease cutting, skin sensitivity, or antimicrobial activity of a formula.

In certain preferred embodiments, the surfactant base includes LAS and sodium xylene sulfate and is prepared by mixing LAS and caustic soda for about 5-10 minutes prior to addition of sodium xylene sulfate.

Foam Booster

Foam boosters or foam stabilizers are included in detergent compositions to enhance the foam quantity, quality, and the foam lastingness. Additionally, foam boosters or stabilizers provide additional benefits to the detergent composition such as emolliency, detergency, etc. For instance, the feel of a user's hands after, for example, using hand dish detergents or hand soaps may be affected by the foam boosters or stabilizers. Thus, foam production and foam life are not the only considerations when choosing the foam booster or stabilizer. Effect on the user is also an important consideration.

Selection of foam stabilizers includes balancing a substances ability to produce abundant levels of foam and extended foam life with any adverse effect on the user's hands. In particular, where the user immerses his or her hands in a solution containing the detergent composition, corrosivity or irritation concerns arise. A "Toxicity Category Label (TCL)" is a standard for determining irritancy accepted by the United States Environmental Protection Agency (US EPA). Within this system of evaluation, products are ranked on a scale of 1-4: 1-Corrosive, 2-Severe Irritant, 3-Moderate Irritant and 4-Mild\Slight Irritant. Preferably, when subject to testing related to this TCL, the compositions produce a rating score of 4 indicating their mildness.

Foam booster/stabilizers are included (as a mixture) in the detergent composition at amounts of from about 0.1% to about 20% by weight of the detergent composition. The mixture of foam booster and/or foam stabilizer is referred to herein as a "foaming booster." Preferably, the foaming booster comprises about 1% to about 20% by weight of the detergent composition. More preferably, the foaming booster ranges from about 5% to about 20% by weight of the detergent composition. In highly preferred embodiments, the foaming booster is about 5% to about 17% by weight of the detergent composition. In other embodiments, the foaming booster is included in the detergent composition at an amount of from about 5 to about 15 percent, or from about 5 to about 10 percent, or from about 10 to about 20 percent.

The foaming boosters herein are comprised of a blend of polyethyleneimine ethoxylates (PEIE) and high molecular weight polyethylene glycol (PEG), and optionally amine oxide, which results in improved foaming characteristics compared to hand dishwashing detergents comprised of amine oxide alone.

In particular, it was observed that the amount of amine oxide in hand dishwashing formulations can be reduced by up to 90% and backfilled with blends of polyethyleneimine ethoxylates (PEIE) and high molecular weight polyethylene glycol (PEG) (200,000 Dalton mw) to maintain foam performance. In some examples, AO can be eliminated completely and replaced with a blend of PEIE and PEG.

Unexpectedly, it was observed that blends of AO, PEG and PEIE generated more foam when used together, rather than just by themselves in the formulation (i.e., compared to a control using only AO with no PEG or PEIE).

In some embodiments, the amount of AO is reduced by up to 90% and backfilled with blends of PEIE and high molecular weight PEG to maintain foaming properties and performance.

In certain embodiments, the amount of AO can be eliminated completely and replaced with blends of PEIE and PEG.

Amine Oxide (AO)

Amine Oxide (AO), also known as amine-N-oxide and N-oxide, is a chemical compound that contains the functional group $R_3N+$—O—, an N—O coordinate covalent bond with three additional hydrogen and/or hydrocarbon side chains attached to N. Amine oxides useful in the present invention include those compounds having the formula:

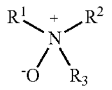

wherein $R^3$ is selected from an alkyl, hydroxyalkyl, acylamidopropyl and alkyl phenyl group, or mixtures thereof, containing from 8 to 26 carbon atoms, preferably 8 to 16 carbon atoms; $R^4$ is an alkylene or hydroxyalkylene group containing from 2 to 3 carbon atoms, preferably 2 carbon atoms, or mixtures thereof; x is from 0 to 3, preferably 0; and each $R^5$ is an alkyl or hydroxyalkyl group containing from 1 to 3, preferably from 1 to 2 carbon atoms, or a polyethylene oxide group containing from 1 to 3, preferably 1, ethylene oxide groups, the $R^5$ groups can be attached to each other, e.g., through an oxygen or nitrogen atom, to form a ring structure.

These amine oxide surfactants in particular include $C_{10}$-$C_{18}$ alkyl dimethyl amine oxides and $C_8$-$C_{12}$ alkoxy ethyl dihydroxyethyl amine oxides. Examples of such materials include dimethyloctylamine oxide, diethyldecylamine oxide, bis-(2-hydroxyethyl)dodecylamine oxide, dimethyldodecylamine oxide, dipropyltetradecylamine oxide, methylethylhexadecylamine oxide, dodecylamidopropyl dimethylamine oxide and dimethyl-2-hydroxyoctadecylamine oxide.

In certain embodiments, the N-amine oxide is a $C_{10}$-16 alkyldimethylamine oxide or lauramidopropyl amine oxide. Exemplary amine oxides are coco dimethyl amine oxide or coco amido propyl dimethyl amine oxide. In certain preferred embodiments, the n-amine oxide is lauramine oxide or lauramidopropyl amine oxide.

Polyethyleneimine Ethoxylate (PEIE)

Polyethyleneimine-ethoxylated polymer (PEI-EO or PEIE) used in accordance with the present disclosure may include a polyethyleneimine backbone that has a weight average molecular weight of from about 400 Daltons to about 10,000 Daltons, for example from about 400 Daltons to about 6,000 Daltons, such as from about 400 Daltons to about 1,800 Daltons. The substitution of the polyethyleneimine backbone may include one or two ethoxylation modifications per nitrogen atom, dependent on whether the modification occurs at an internal nitrogen atom or at a terminal nitrogen atom in the polyethyleneimine backbone. The ethoxylation modification may consists of the replacement of a hydrogen atom by a polyoxyethylene chain having an average of about 40 to about 90 ethoxy units per modification, for example about 45 to about 80 ethoxy units, such as about 50 to about 80 ethoxy units. Methods of preparing PEIE having various molecular weight and degrees of ethoxylation are described, e.g., in U.S. Pat. No. 5,858,948.

In certain embodiments, the PEIE has a molecular weight of 600 modified by ethoxylation to a degree of about 20 ethyleneoxy residues per nitrogen (PEI 600 $EO_{20}$). An exemplary method of preparing PEI 600 $EO_{20}$ can be found in Example 7 of U.S. Pat. No. 5,858,948.

Polyethylene Glycol (PEG)

Polyethylene glycol is a species of polyglycol homopolymer. Preferably, the PEG has a high molecular weight.

As used in the present disclosure, a relatively high molecular weight polyethylene glycol means one having a number average molecular weight of at least about 50,000 Daltons. In particular, the polyethylene glycol used may be one having a number-average molecular weight of about 200,000 Daltons. In other embodiments, the PEG may have a number-average molecular weight of about 50,000 to about 500,000 Daltons, or about 100,000 to about 400,000 Daltons, or about 150,000 to about 250,000 Daltons.

With regard to the foam booster mixture of the detergent composition, each component may have a different compositional percentage of the combined total weight of the foaming booster (with the three specified components adding to 100%).

Figure 2:
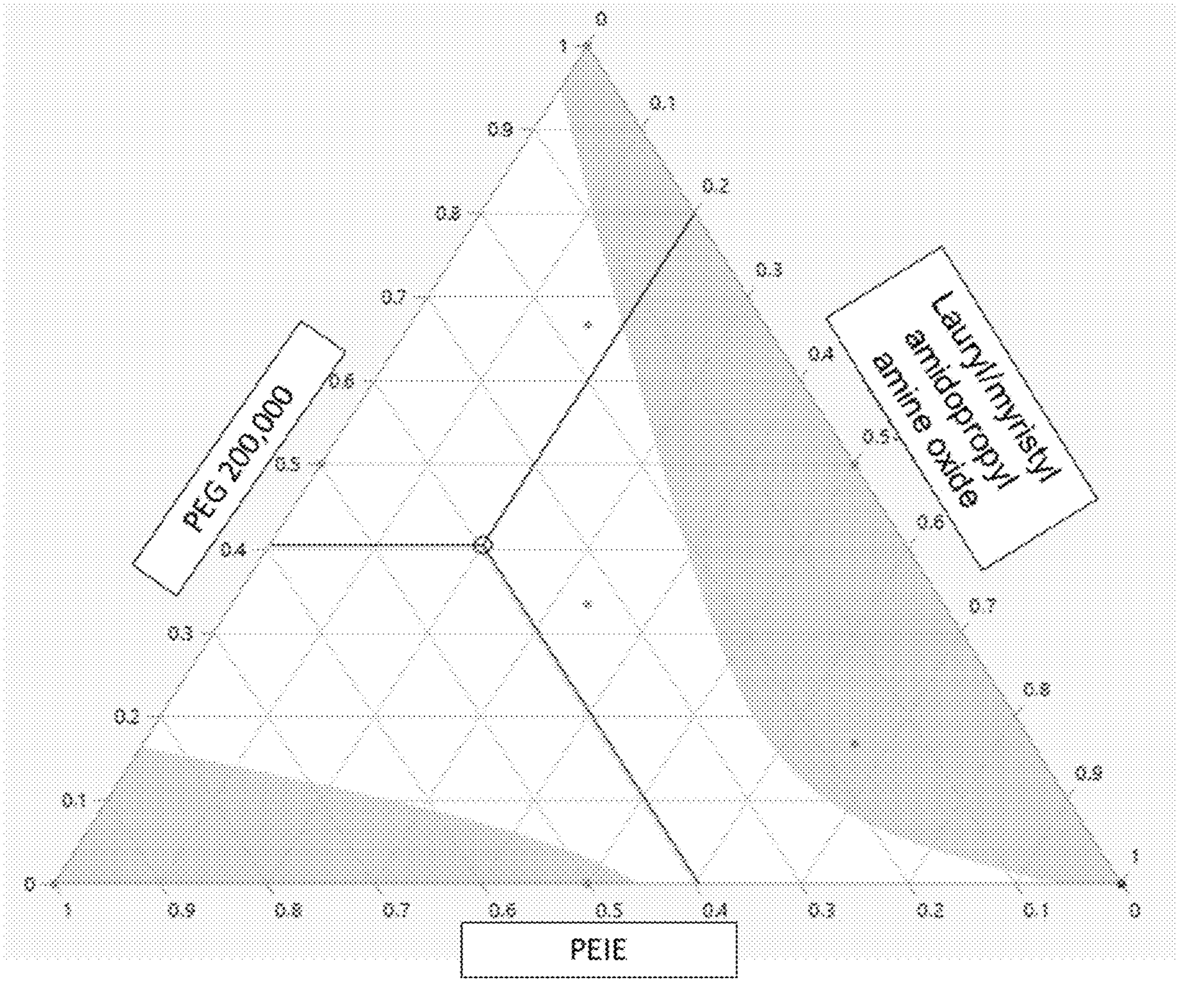
FIG. 2 is a ternary plot showing ratios of polyethylene glycol PEG, to an 30% active amine oxide (AO) ingredient to 80% polyethyleneimine, alkoxylated (PEIE) ingredient in a hand dishwashing detergent at the completion (5 min) of a Ross-Miles foam test. The white area indicates a foam height of 14.2 cm or greater.

For example, AO may be about 0% to about 95% by weight, or about 1% to about 90%, or about 60%, or about 13% by weight of the foaming booster, depending on the raw material concentration of ingredients used. For instance, FIGS. 1 and 2 are ternary plots showing ratios of a commercially supplied amine oxide (AO) ingredient that contains 30% amine oxide mixed with inactive material, such as water. In certain embodiments, AO is about 45% to about 95% by weight of the foaming booster when a 30% active commercially supplied ingredient is used.

Likewise, PEI-EO may be about 0% to about 100%, or about 5% to about 85%, or about 5% to about 55%, or about 6% to about 82%, or about 10%, or about 25% by weight of the foaming booster, depending on the raw material concentration of ingredients used. FIGS. 1 and 2 show ratios of a commercially supplied PEIE that contains 80% active PEIE and 20% inactive material, such as water.

Still further, polyethylene glycol may be about 0% to about 100% by weight of the foaming booster, or about 15% to about 95%, or about 1.5% to about 93%, or about 15% to about 93% by weight of the foaming booster. FIGS. 1 and 2 show ratios of a commercially supplied 100% active PEG.

Various ratios of AO to PEI-EO to PEG within the detergent composition have been found to result in improved and sustained foaming and foam height. For purposes of greater explication, TABLE 1 presents weight percentages in accordance with 10 exemplary hand dishwashing detergent compositions of the present disclosure for the amount of active AO, PEI-EO and PEG based on the total combined weight of the active AO, PEI-EO and PEG in the foam booster composition (TABLE 2, set forth later in this disclosure, provides the weight percentage of each such component on the basis of the overall weight of an exemplary detergent composition). It should be appreciated that the values shown in TABLE 1 may be understood to allow the person having ordinary skill in the art to interpolate/extrapolate other suitable percentages of the AO, PEI-EO and PEG for use in a suitable hand dishwashing detergent composition.

TABLE 1

| Comp. | PEG | PEI-EO | AO |
|---|---|---|---|
| FB1 | 78 | 16 | 6 |
| FB2 | 56 | 44 | 0 |
| FB3 | 48 | 38 | 14 |
| FB4 | 33 | 27 | 40 |
| FB5 | 0 | 73 | 27 |
| FB6 | 0 | 0 | 100 |
| FB7 | 22 | 71 | 7 |
| FB8 | 100 | 0 | 0 |
| FB9 | 77 | 0 | 23 |
| FB10 | 0 | 100 | 0 |

Besides the components described above, the detergent compositions may optionally include further components that may be useful for purposes other than foaming or soil removal.

The detergent composition herein may comprise a number of optional ingredients such as builders, chelants, conditioning polymers, cleaning polymers, surface modifying polymers, soil flocculating polymers, structurants, emollients, humectants, skin rejuvenating actives, enzymes, carboxylic acids, scrubbing particles, bleach and bleach activators, perfumes, malodor control agents, pigments, dyes, opacifiers, beads, pearlescent particles, microcapsules, inorganic cations such as alkaline earth metals such as Ca/Mg-ions, antibacterial agents, preservatives and pH adjusters and buffering means Chelators bind and remove calcium, magnesium, or other metals from water, and may optionally be included in the detergent composition. Many compounds can be used as water softeners, including but not limited to ethylenediaminetetraacetic acid (EDTA), nitrilotriacetic acid, diethylenetriaminepenta(methylenephosphonic acid), nitrilotris (methylenephosphonic acid), 1-hydroxyethane-1,1-diphosphonic acid, iminodisuccinic acid (IDS), or other chelating agents. Chelators may be present in the wash composition at an amount of from about 0 to about 5 weight percent in an exemplary embodiment, but in alternate embodiments the chelators are present at an amount of from about 0.01 to about 3 weight percent or an amount of from about 0.02 to about 1 weight percent, based on the total weight of the detergent composition.

The components of the detergent composition are combined and mixed together with a mixer. Once mixed, the wash composition is filled in a suitable container. The components of the detergent composition may all be mixed at one time, or different components may be pre-mixed and then combined. A wide variety of mixers may be used in alternate embodiments, such as an agitator, an in-line mixer, a ribbon blender, an emulsifier, and others. The container may be sealed with lid or a sealer, where the sealer may utilize heat, water, ultrasonic techniques, water and heat, pressure, or other techniques for sealing the container.

Method of Washing

Another exemplary embodiment is also directed to the use of a detergent composition as described above in a cleaning process such washing dishware and/or hard surface cleaning. In particular, an embodiment is directed to the use of a detergent composition in hand dishwashing or in hard surface cleaning such as car washing, and the cleaning of industrial surfaces.

In one embodiment, the dirty dishware are added to a sink or basin and detergent composition is also added to the sink before wash water is added. In an alternate embodiment, the detergent may be added to the wash water with the dishes after the washing process has begun. The dishes may then be dried and processed as normal.

The composition herein can be applied in its diluted form. Soiled dishes are contacted with an effective amount, typically from about 0.5 ml to about 20 ml (per about 25 dishes being treated), preferably from about 3 ml to about 10 ml, of the detergent composition, preferably in liquid form, of the present invention diluted in water. The actual amount of detergent composition used will be based on the judgment of user, and will typically depend upon factors such as the particular product formulation of the composition, including the concentration of active ingredients in the composition, the number of soiled dishes to be cleaned, the degree of soiling on the dishes, and the like. Generally, from about 0.01 ml to about 150 ml, preferably from about 3 ml to about 40 ml of a liquid detergent composition of the invention is combined with from about 2000 ml to about 20000 ml, more typically from about 5000 ml to about 15000 ml of water in a sink having a volumetric capacity in the range of from about 1000 ml to about 20000 ml, more typically from about 5000 ml to about 15000 ml. The soiled dishes are immersed in the sink containing the diluted compositions then obtained, where contacting the soiled surface of the dish with a cloth, sponge, or similar article cleans them. The cloth, sponge, or similar article may be immersed in the detergent composition and water mixture prior to being contacted with the dish surface, and is typically contacted with the dish surface for a period of time ranged from about 1 to about 10 seconds, although the actual time will vary with each application and user. The contacting of cloth, sponge, or similar article to the dish surface is preferably accompanied by a concurrent scrubbing of the dish surface.

Another method may comprise immersing the soiled dishes into a water bath or held under running water without any liquid dishwashing detergent. A device for absorbing liquid dishwashing detergent, such as a sponge, is placed directly into contact with a separate quantity of undiluted liquid dishwashing composition for a period of time typically ranging from about 1 to about 5 seconds. The absorbing device, and consequently the undiluted liquid dishwashing composition, is then contacted individually to the surface of each of the soiled dishes to remove said soiling. The absorbing device is typically contacted with each dish surface for a period of time range from about 1 to about 10 seconds, although the actual time of application will be dependent upon factors such as the degree of soiling of the dish. The contacting of the absorbing device to the dish surface is preferably accompanied by concurrent scrubbing.

Alternatively, the dishware may be immersed in a mixture of the hand dishwashing composition and water prior to being contacted with the dish surface, the concentrated solution is made by diluting the hand dishwashing composition with water in a small container that can accommodate the cleaning device at weight ratios ranging from about 95:5 to about 5:95, preferably about 80:20 to about 20:80 and more preferably about 70:30 to about 30:70, respectively, of hand dishwashing liquid:water respectively depending upon the user habits and the cleaning task.

Performance

One method to measure the foamability of surfactant solutions, and the stability of the foam produced is set forth in ASTM D1173-53 (Reapproved 2001) Standard Test Method for Foaming Properties of Surface-Active Agents, commonly referred to as "the Ross-Miles test." The Ross-Miles test is based on height of the resulting foam.

Under the Ross-Miles test, the foam-forming solution is placed in a high, cylindrical tempered receiver vessel with standard dimensions. A second quantity of the same solution is introduced from above by means of a likewise standardized reservoir. This passes through the column and forms foam as a result of the turbulence on mixing with the receiving phase. The foam height is measured as soon as the reservoir is empty and also after one, three and five minutes. The dimensions of the standardized receiver and reservoir lead to a height of the setup of more than one meter. The foam height measurement is taken at the top of the foam column only, not considering the changing height of the liquid-foam-boundary due to drainage. Consumers typically prefer detergents that have a higher foam height measurement. Premium detergents will typically have an initial foam height greater than 150 mm using the Ross-Miles test.

The invention provides a method to produce hand dishwashing compositions having an initial foam height greater than 150 mm, more preferably greater than at 160 mm, most preferably greater than 165 mm, while minimizing the amount of AO in the composition.

In preferred embodiments, the invention provides a method of producing hand dishwashing compositions having an initial foam height greater than 150 mm, more preferably greater than at 160 mm, most preferably greater than 165 mm, that are substantially free of AO.

In certain embodiments, the invention provides a detergent having an initial foam height greater than 165 mm using the procedures in ASTM D1173-53 (the Ross-Miles test).

In certain embodiments, the invention provides a detergent having a 5-minute foam height of greater than 140 mm, more preferably greater than 141 mm, most preferably 142 mm or greater than 142 mm, at using the procedures in ASTM D1173-53 (the Ross-Miles test).

Another method of assessing the performance of a hand dishwashing detergent is by plate count via the test procedures set forth in ASTM D 4009-92 (Reapproved 1997) Standard Guide for Foam Stability of Hand Dishwashing Detergents, which is commonly referred to as a "plate test." The higher the plate count, the longer the foam longevity and the higher the cleaning. For context, a leading value dish detergent has a plate count of 7.5 in this test. This value of 7.5 can be considered a lower value desired to achieve good consumer acceptability of the product.

In certain embodiments, the invention provides methods to produce a hand dishwashing detergent having a plate count greater than 7.5.

Preferably, the invention provides detergent compositions and methods of manufacturing hand dishwashing detergent compositions having a plate count greater than 7.5.

EXAMPLES

The formulations and methods described herein are now further detailed with reference to the following examples. These examples are provided for the purpose of illustration only and the embodiments described herein should in no way be construed as being limited to these examples. Rather, the embodiments should be construed to encompass any and all variations which become evident as a result of the teaching provided herein.

Example 1: Detergent Composition Design of Experiment

Ten exemplary detergent compositions were prepared according to the foregoing description, wherein the ratios of active AO, active PEI-EO, and active PEG for each exemplary composition are set forth in TABLE 1, and wherein the sum of the AO, PEI-EO, and PEG components for each exemplary composition was 6.55 weight percent of the total detergent composition. The AO utilized was a lauryl/myristyl amidoamine oxide (LMDO) composition having 30% activity; the PEI-EO was a polyethyleneimine, alkoxylated composition having 80% activity (PEIE); the PEG had a molecular weight of 200,000 and was 100% active. The detergent composition for all of the examples also included the components shown in TABLE 2.

TABLE 2

| Component | Activity (%) | Active % | Weight % |
|---|---|---|---|
| DI Water | 100 | 27.70 | 27.70 |
| NaOH | 50 | 2.60 | 5.20 |
| LAS | 96 | 18.71 | 19.49 |
| Sodium xylene sulfate | 40 | 3.00 | 7.50 |
| Chelator | 38.5 | 0.06 | 0.15 |
| SLS | 30 | 10.00 | 33.33 |
| Foaming Booster (see TABLE 1 for active ratios) | — | — | 6.55 |
| Preservative | 16 | 0.0128 | 0.08 |
| | | Total | 100.00 |

The ten compositions shown in TABLE 3 were subject to experimentation; composition 6 being the comparative formula and control solely comprising AO (i.e., no PEG or PEI-EO). The active amount of PEG, PEI-EO and AO for each composition is shown in TABLE 4.

TABLE 3

| | | FB ingredients Wt % | | | |
|---|---|---|---|---|---|
| Comp. # | Detergent Base | PEG 200,000 | PEI-EO (80%) | AO (30%) | Total |
| 1 | 93.45 | 4.37 | 1.09 | 1.09 | 100 |
| 2 | 93.45 | 3.28 | 3.28 | 0.00 | 100 |
| 3 | 93.45 | 2.18 | 2.18 | 2.18 | 100 |
| 4 | 93.45 | 1.09 | 1.09 | 4.37 | 100 |
| 5 | 93.45 | 0.00 | 3.28 | 3.28 | 100 |
| 6 | 93.45 | 0.00 | 0.00 | 6.55 | 100 |
| 7 | 93.45 | 1.09 | 4.37 | 1.09 | 100 |
| 8 | 93.45 | 6.55 | 0.00 | 0.00 | 100 |
| 9 | 93.45 | 3.28 | 0.00 | 3.28 | 100 |
| 10 | 93.45 | 0.00 | 6.55 | 0.00 | 100 |

TABLE 4

| | FB Actives wt % | | |
|---|---|---|---|
| Comp. # | PEG | PEIE | LMDO |
| 1 | 4.37 | 0.87 | 0.33 |
| 2 | 3.28 | 2.62 | 0 |
| 3 | 2.18 | 1.74 | 0.65 |
| 4 | 1.09 | 0.87 | 1.31 |
| 5 | 0.00 | 2.62 | 0.98 |
| 6 | 0.00 | 0 | 1.97 |
| 7 | 1.09 | 3.50 | 0.33 |
| 8 | 6.55 | 0 | 0 |
| 9 | 3.28 | 0 | 0.98 |
| 10 | 0.00 | 5.24 | 0 |

Example 2: Ross-Miles Foam Testing

For each composition in TABLE 3, the Ross-Miles foam test was performed with the foam height measured in centimeters at the following time points: initial, 1 minute, 2.5 minute, and 5 minutes. The results of the Ross-Miles test are shown in TABLE 4 below.

TABLE 4

| | Height at minute in cm | | | |
|---|---|---|---|---|
| | 0.0 | 1.0 | 2.5 | 5.0 |
| Composition 1 | 16.5 | 15.0 | 14.5 | 14.0 |
| Composition 2 | 18.0 | 16.5 | 16.0 | 15.5 |
| Composition 3 | 17.0 | 15.5 | 15.0 | 14.5 |
| Composition 4 | 16.5 | 15.0 | 15.0 | 14.5 |
| Composition 5 | 17.0 | 15.0 | 14.5 | 14.0 |
| Composition 6 | 16.5 | 14.5 | 14.0 | 14.0 |
| Composition 7 | 14.5 | 14.0 | 13.5 | 13.0 |
| Composition 8 | 15.5 | 14.5 | 14.5 | 14.0 |
| Composition 9 | 15.0 | 14.0 | 14.0 | 13.3 |
| Composition 10 | 15.3 | 14.0 | 13.0 | 13.0 |

Statistical analysis was then performed utilizing JMP software to obtain p-values, R-squared and predictive expressions. Composition 7 was eliminated due to lack of fit with the data.

TABLE 5

| Statistical Analysis from JMP Software | | | |
|---|---|---|---|
| | R Squared | p-value | Predictive Expression |
| Initial | 0.99 | 0.0001 | 15.5*PEG + 15.3*PEIE + 16.5*AO + PEG*(PEIE*10.47) + PEG*(AO*−3.93) + PEIE*(AO*4.46) |
| 1 min | 0.98 | 0.01 | 14.42*PEG + 14*PEIE + 14.56*AO + PEG*(PEIE*8.9) + PEG*(AO*−1.98) + PEIE*(AO*3.18) |
| 2.5 min | 0.9 | 0.1 | 14.35*PEG + 13.01*PEIE + 14.17*AO + PEG*(PEIE*8.42) + PEG*(AO*−1.28) + PEIE*(AO*4.06) |
| 5 min | 0.9 | 0.096 | 13.86*PEG + 13*PEIE + 14.1*AO + PEG*(PEIE*7.8) + PEG*(AO*−2.72) + PEIE*(AO*2.34) |

The p-value for each time point indicated significance in the data as the p-value≤0.1.

The initial results of the Ross-Miles test are depicted as a ternary plot in FIG. 1. The ternary plot of FIG. 1 shows that the blend of the three foaming booster components (AO, PEIE and PEG), represented by the white space, shows an improvement in foaming over formulations with only one of the components (i.e., only one of AO, PEIE or PEG), represented by the corners of the ternary plot.

The white space in the ternary plot of FIG. 1 shows a foam height of at least 16.6 cm, with the control composition having a foam height of 16.5 cm.

The final results of the Ross-Miles foam test recorded at 5 minutes are depicted in FIG. 2. The ternary plot of FIG. 2 shows the blend of AO, PEIE and PEG having a foam height of at least 14.2 cm, with the control composition having a foam height of 14 cm. Hence, the blend of AO, PEIE and PEG outperforms any composition containing only one material (i.e., only one of AO or PEIE or PEG).

Based on the results of the Ross-Miles foam test as depicted in FIG. 2, beneficial ratios of those compositions containing only two materials are as follows:

(i) PEIE to PEG ratio: "0.85 to 0.15" to "0.05 to 0.95"

(ii) PEIE to AO ratio: "0.05 to 0.95" to "0.55 to 0.45"

Based on the results of the Ross-Miles foam test as depicted in FIG. 2, for those hand dishwashing detergent composition containing all three materials, the beneficial ratio of PEG to PEIE to AO is:

(i) "0.93 to 0.06 to 0.01" to
(ii) "0.156 to 0.25 to 0.594" to
(iii) "0.015 to 0.095 to 0.89" to
(iv) "0.167 to 0.82 to 0.013" to
(v) "0.93 to 0.06 to 0.01"

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A hand dishwashing detergent composition comprising:
water;
surfactant base; and
foaming booster consisting of polyethyleneimine ethoxylate and polyethylene glycol;
wherein the composition is free of amine oxide,
wherein the polyethylene glycol has a molecular weight of 200,000 Daltons.

2. The hand dishwashing detergent composition of claim 1, wherein the polyethyleneimine ethoxylate is about 5% to about 85% by weight of the foaming booster.

3. The hand dishwashing detergent composition of claim 1, wherein water comprises less than 50% by weight of the detergent composition.

4. The hand dishwashing detergent composition of claim 1, wherein the polyethyleneimine ethoxylate comprises polyethylene imine having a molecular weight of 600 modified by ethoxylation to a degree of about 20 ethyleneoxy residues per nitrogen (PEI 600 $EO_{20}$).

5. The hand dishwashing detergent composition of claim 4, wherein the polyethyleneimine ethoxylate consists of polyethylene imine having a molecular weight of 600 modified by ethoxylation to a degree of about 20 ethyleneoxy residues per nitrogen (PEI 600 $EO_{20}$).

* * * * *